United States Patent Office 3,217,742
Patented Nov. 16, 1965

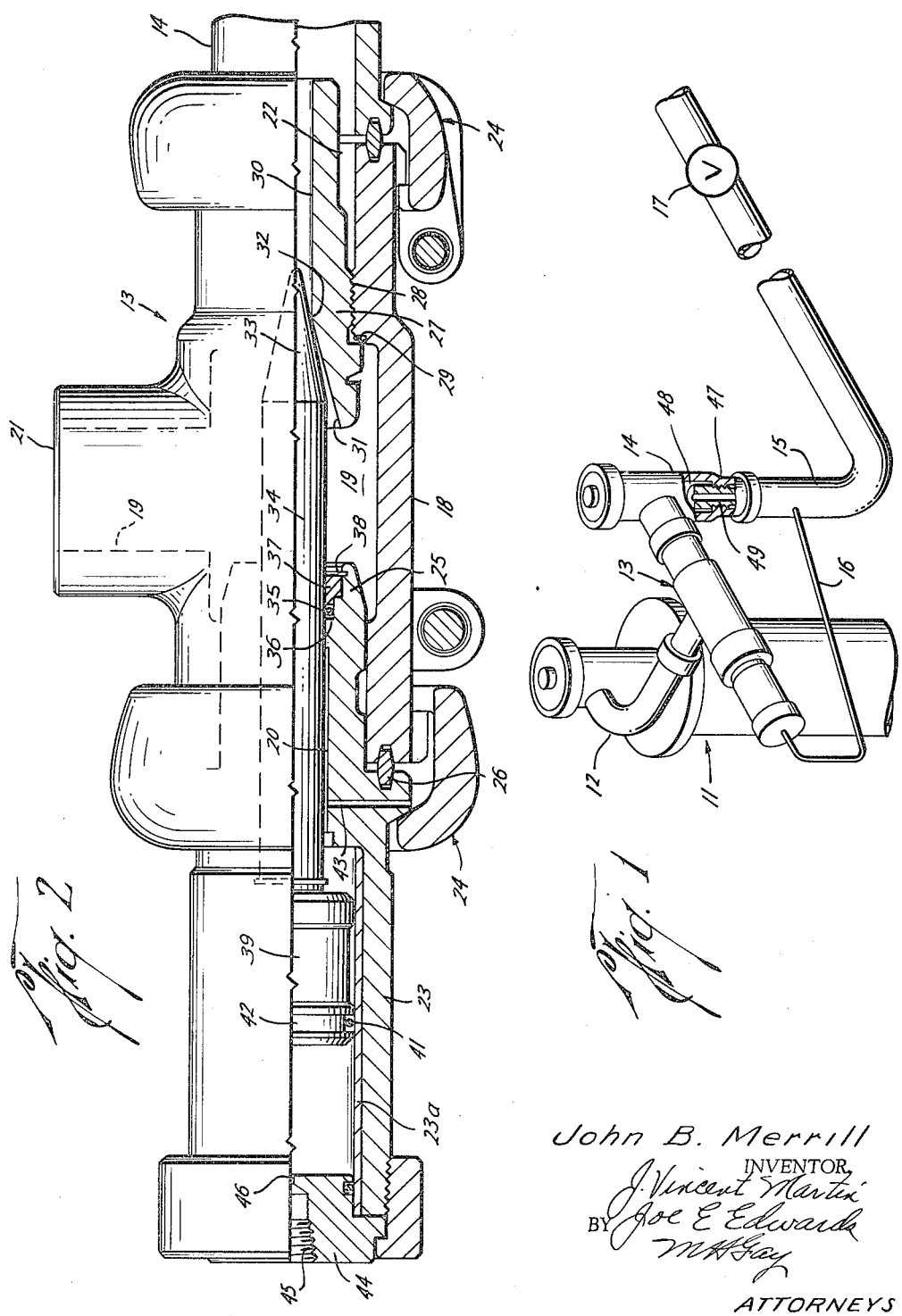

3,217,742
FLOW CONTROL APPARATUS
John B. Merrill, West Covina, Calif., assignor to Thornhill-Craver Company, Houston, Tex., a corporation of Texas
Filed Mar. 19, 1962, Ser. No. 180,601
4 Claims. (Cl. 137—509)

This invention relates to flow control systems and apparatus, and more particularly to a system for opening and closing a valve from a remote location by control of the pressure in the line downstream from the valve.

In many instances it is desirable to be able to shut in a well from a remote location. For instance, it may be desirable to close in a well at a remote location for a portion of a month to comply with government regulation of maximum production. By way of further example, repairs to a refinery, manifold, etc., may make it desirable to be able to quickly shut in a well from a remote point downstream without subjecting the pipe line to well pressure.

It is an object of this invention to provide a well control system which is simple in construction, and which permits shutting in the well from a remote location.

Another object of this invention is to provide a simple apparatus and system for shutting in a well from a remote location by the simple expedient of blocking flow in the line to permit pressure in the line to increase wherein the well is shut in before the line is subjected to full well pressure.

Another object is to provide a simple apparatus and system as in the preceding object in which the well may be returned to production merely by opening the line and permitting pressure therein to reduce.

Other objects, features and advantages of this invention will be apparent from the drawings, the specification and the claims.

In the drawing, wherein an illustrative embodiment of this invention is shown, and wherein like reference numerals indicate like parts;

FIGURE 1 is a schematic illustration of a system employing this invention; and,

FIGURE 2 is a view partially in elevation and partially in quarter cross-section illustrating the preferred form of apparatus for shutting in a well.

In FIGURE 1 the well head 11 has an outlet conduit 12. Secured to the outlet conduit 12 is a valve and motor operator therefor indicated generally at 13. The outlet of the apparatus 13 is connected to the flow bean assembly 14, which in turn is connected to the flow line 15. Pressure fluid from line 15 is fed to the motor operator of apparatus 13 through line 16. Control of the apparatus is provided by a valve 17 at a remote point in pipe 15.

Reference is now made to FIGURE 2 wherein the apparatus 13 is more fully shown. The apparatus includes a body 18 having a flowway 19 therethrough. This flowway commences at the inlet 21 and extends to the outlet 22 of body 18. The inlet section of flowway 19 is indicated in dashed outline as this portion of the body is shown in elevation.

The inlet end 21 of the flowway is connected to the well through the pipe 12. The outlet end 22 of the flowway is connected to pipe 15 through the flow bean assembly 14 as hereinabove described.

A cylinder 23 is carried by the body for purpose which will appear hereinafter. The cylinder 23 is attached to the body 18 by a conventional type of quick release coupling indicated generally at 24. The same type of coupling 24 secures the body and flow bean assembly together. The cylinder has a boss 25 which extends into the body 18 and centers the cylinder relative to the body. A seal 26 is provided between the body and cylinder assembly to prevent leakage therebetween.

A valve seat member 27 is provided across the flowway and is secured in the body through the threaded engagement 28. A suitable seal 29 is provided between the body and valve seat member to prevent flow therebetween. The valve seat member may be of the type having a frusto-conical inlet 31 so that seating will occur at the point 32 wherein the frusto-conical surface joins the cylindrical bore 30 through the seat member 27 so as to provide a line contact seat surface.

A valve member 33 cooperates with the valve seat member 27 to control flow through the body. It will be noted that the valve member may be conical in form with the angle of the cone being slightly less than the angle of the frusto-conical section 31 of the valve seat, so that the valve member will meet the valve seat at the point 32 with a line contact. Any desired form of valve member and seat may be substituted for the valve member and seat illustrated.

A valve stem 34 is connected to the valve member 33 and may be integral therewith as illustrated. The valve stem 34 extends through bore 20 in boss 25 and is mounted for reciprocation in the flowway 19 and in the cylinder 23.

A seal means is provided between said stem and body which in part defines said flowway. The seal means may be provided by O-ring 35 carried in a counterbore 36 in the end of boss 25. A seal retainer 37 is provided in the open end of the bore 36 and held in place by a snap ring 38 to complete the seal assembly.

A piston 39 is mounted in said cylinder 23 and cooperates with said stem 34 to urge the stem toward valve-closing position. Preferably, the piston is separate from the stem as illustrated. It is also preferred that the cylinder 23 be provided with a liner 23a which may be replaced when desired. The piston may have a seal with the cylinder in any desired manner, such as by the sliding seal provided by the O-ring 41 in O-ring groove 42 in the outer periphery of piston 39.

The piston 39 will have a greater diameter than the seal 35. This will result in an effective area on the piston 39 which is greater than the effective area of seal 35, and thus the area on which pressure will act on the valve stem 34 tending to urge it toward piston 39. Of course, the area of the seal 35 will be greater than the effective area of valve seat 27 to provide a pressure-responsive area on the valve stem 34. This relationship is desired to permit closing of the valve under the influence of piston 39 with a pressure which is less than pressure in the flowway 19 upstream of valve seat 32. By providing means for venting the side of the piston adjacent to the valve stem as by the vent passageway 43, it will be appreciated that opening and closing of valve member 33 will depend upon the force exerted by pressure on the side of piston 39 remote from the valve stem.

The end of the cylinder remote from the seal 35 is connected to the pipe 15 downstream of the flow bean assembly 14 by a conduit 16. The conduit 16 connects to the end plug 44 in the end of cylinder 23 through the threaded port 45. It will be noted that the communication between port 45 and the end of cylinder 23 is provided through a small bleed opening 46 which restricts flow of pressure fluid therethrough. This will provide a dashpot action which will prevent rapid movement of the piston and valve member to prevent hammering of the parts.

It will be noted that the flow bean assembly 14 (FIG. 1) is upstream of valve 17 and upstream of the connection of conduit 16 with pipe 15. This flow bean assembly is conventional in form and includes a body 47 having a flowway 48 therethrough and a flow bean 49 secured therein for effecting a pressure drop thereacross. Conventionally all of the parts of the well head, valve, etc., upstream of the flow bean will be constructed to withstand high pressures and the pressure will be reduced at the flow bean to a pressure which can be handled by a much thinner wall pipe 15.

In operation, the apparatus 13 is connected in the outlet flow line of a well such as well 11 in the manner shown in FIGURE 1. So long as the outlet line 15 is open, the relationship of the area of piston 39 to seal 35 is such that the pressure downstream of the flow bean acting on piston 39 produces a force less than the force of the well pressure on the valve stem 34, and thus the valve remains open. If at any time it is desired to shut in the well, it is only necessary to close valve 17. This stops flow of fluid through the line and permits pressure to begin to build up in pipe 15. As this pressure builds up, the pressure is increased in the cylinder 23 until the force resulting from this pressure over the area of piston 39 is greater than the force exerted by well pressure acting over the area of seal 35, and the piston moves the valve stem and valve member to closed position. The valve 33 will remain in closed position so long as the valve 17 is closed, and the wall will be shut in. Obviously, the relationship of the area of piston 39 and seal 35 will be such that the well will be shut in at a much lesser pressure in the line 15 than wellhead pressure, so that the line 15 will not be exposed to excessive pressure.

When it is desired to place the well back on stream, it is only necessary to open valve 17 and let the pressure fluid trapped upstream of the valve move through the valve 17. This reduces the pressure in line 15, which results in a reduced pressure in cylinder 23. As soon as the force exerted by the pressure across the area of piston 39 is reduced to a sufficient value, the wellhead pressure exerted on the effective area of valve stem 34 plus the pressure in line 15 on the effective area of valve seat 27 will move the valve stem and valve member 33 toward open position. Due to the action of the bleed or restriction 46, the pressure within cylinder 23 will exhaust therefrom slowly, and hammering of the piston against the enclosure 44 will be avoided.

From the above it will be seen that all of the objects of this invention have been obtained. A very simple valve and motor operator therefor have been provided which can be controlled merely by shutting in or releasing pressure from the outlet line of the well. This shutting in of the line may be at any point remote from the well, as it is only necessary to build up pressure in the line to effect shutting in of the well. It is particularly emphasized that the well can be placed on stream again merely by opening the valve 17, and it is not necessary to send a signal to the well location, or to send personnel to manually reset the valve in open position. As the outlet line is in communication with the cylinder 23 at all times, the need for special valves to vent or pressurize chambers or pilot operators is eliminated.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A well control system comprising,
a body having a flowway therethrough,
a cylinder carried by the body,
a pipe connected to the outlet end of the flowway,
a valve seat across said flowway,
a valve member cooperable with said seat to control flow therethrough,
a valve stem connected to said valve member and mounted for reciprocation in said cylinder and flowway and having a greater effective area than said valve seat,
seal means between said stem and body in part defining said flowway,
a piston mounted in said cylinder and cooperable with said stem to urge the stem toward valve-closing position, said piston having a greater diameter than said seal means,
means venting the end of said cylinder adjacent to said seal means to atmosphere,
valve means in said pipe and controlling flow through said pipe, said pipe conducting all of the fluid passing through said flowway to said valve means,
means between said valve means and valve seat reducing pressure in said pipe at said valve means to a value less than pressure at the inlet of said flowway, and
conduit means connecting the end of the cylinder remote from said seal means to said pipe between said pressure-reducing means and said valve means.

2. A well control system comprising,
a body having a flowway therethrough,
a cylinder carried by the body,
a pipe connected to the outlet end of the flowway,
a valve seat across said flowway,
a valve member cooperable with said seat to control flow therethrough,
a valve stem connected to said valve member and mounted for reciprocation in said cylinder and flowway and having a greater effective area than said valve seat,
seal means between said stem and body in part defining said flowway,
a piston mounted in said cylinder and cooperable with said stem to urge the stem toward valve-closing position, said piston having a greater diameter than said seal means,
means venting the end of said cylinder adjacent to said seal means to atmosphere,
valve means in said pipe and controlling flow through said pipe, said pipe conducting all of the fluid passing through said flowway to said valve means,
means between said valve means and valve seat reducing pressure in said pipe at said valve means to a value less than pressure at the inlet of said flowway,
conduit means connecting the end of the cylinder remote from said seal means to said pipe between said pressure-reducing means and said valve means, and
means restricting flow of fluid through said conduit means to dampen opening movement of the valve and piston.

3. Well control apparatus comprising,
a body having a flowway therethrough,
a cylinder carried by the body,
pressure-reduction means connected to the outlet end of said flowway,
a valve seat across said flowway upstream from said pressure-reduction means,
a valve member cooperable with said seat to control flow therethrough,
a valve stem connected to said valve member and mounted for reciprocation in said cylinder and flowway and having a greater effective area than said valve seat,
seal means between said stem and body in part defining said flowway,
a piston mounted in said cylinder and cooperable with said stem to urge the stem toward valve-closing position, said piston having a greater diameter than said seal means,
means venting the end of said cylinder adjacent to said seal means to atmosphere, and
means connecting the end of the cylinder remote from said seal to the outlet of said flowway, said last-mentioned means including a restricted section to dampen opening movement of the valve member and piston.

4. A well control system comprising,
a body having a flowway therethrough,
a cylinder carried by the body,
a pipe connected to the outlet end of the flowway,
a valve seat across said flowway,
a valve member cooperable with said seat to control flow therethrough,
a valve stem connected to said valve member and mounted for reciprocation in said cylinder and flowway,
seal means between said stem and body,
a piston mounted in said cylinder and cooperable with said stem to urge the stem toward valve-closing position,
valve means in said pipe and controlling flow through said pipe, said pipe conducting all of the fluid passing through said flowway to said valve means, means between said valve means and valve seat reducing pressure in said pipe at said valve means to a value less than pressure at the inlet of said flowway,
and conduit means connecting the end of the cylinder remote from said seal means to said pipe between said pressure reducing means and said valve means.

References Cited by the Examiner
UNITED STATES PATENTS

| | | | |
|---|---|---|---|
| 617,437 | 1/1899 | Cochran | 251—25 |
| 926,787 | 7/1909 | Virkler | 137—613 X |
| 1,847,343 | 3/1932 | Jackson | 251—25 |
| 2,492,859 | 12/1949 | Griswold | 251—50 X |
| 2,504,720 | 4/1950 | Nixon | 137—613 X |
| 2,550,410 | 4/1951 | Garrett et al. | 137—492 X |
| 3,049,140 | 8/1962 | Thornhill et al. | 137—458 X |

M. CARY NELSON, *Primary Examiner.*

MILTON KAUFMAN, *Examiner.*